United States Patent [19]

Leverett

[11] B 3,928,524

[45] Dec. 23, 1975

[54] PROCESS FOR REDUCING ELECTROSTATIC CHARGE ON POLYTETRAFLUOROETHYLENE AGGLOMERATES

[75] Inventor: Glenn Frederick Leverett, Vienna, W. Va.

[73] Assignee: E. I. Du Pont de Nemours & Company, Wilmington, Del.

[22] Filed: Jan. 17, 1973

[21] Appl. No.: 324,503

[44] Published under the Trial Voluntary Protest Program on January 28, 1975 as document no. B 324,503.

[52] U.S. Cl. ................................. 264/117; 264/122
[51] Int. Cl.$^2$............................................ B01J 2/06
[58] Field of Search ........................... 264/117, 122

[56] References Cited
UNITED STATES PATENTS 2,896,263  7/1959  Frederick et al. .................. 264/117

3,527,857  9/1970  Fitz .................................. 264/117

FOREIGN PATENTS OR APPLICATIONS 1,100,388  1/1968  United Kingdom

Primary Examiner—Robert F. White
Assistant Examiner—James R. Hall

[57] ABSTRACT

Electrolyte is dissolved in the aqueous phase of a two-phase system of water and an organic liquid used as an agitation medium for agglomerating finely ground polytetrafluoroethylene particles, the dissolved electrolyte reducing the electrostatic charge present on the resultant agglomerates after drying. The reduced electrostatic charge on the agglomerates increases their flowability. Particulate filler can be present during the agitation process to become agglomerated together with the polytetrafluoroethylene, and the dissolved electrolyte will also reduce the electrostatic charge on these agglomerates.

5 Claims, No Drawings

PROCESS FOR REDUCING ELECTROSTATIC CHARGE ON POLYTETRAFLUOROETHYLENE AGGLOMERATES

This invention relates to agglomerating particles of finely ground polytetrafluoroethylene by agitation in water which contains an immiscible organic liquid that wets the particles and more particularly to an improvement in this process which reduces the electrostatic charge on the resultant agglomerates when dried.

Various processes have been reported in recent years for increasing the flowability while retaining as much of the moldability (quality of article molded) of particles of finely ground polytetrafluoroethylene as possible by agitating the fine ground particles in a liquid medium in order to agglomerate the particles into larger particles which exhibit the improved flowability. U.S. Pat. No. 3,527,857 to Fitz discloses such a process wherein the liquid medium is disclosed as being a dispersion consisting of water and an organic liquid capable of wetting PTFE and soluble in water to at most 15 percent under the process conditions, at temperatures ranging from 0° to 100°C. This maximum solubility means in essence that the organic liquid is immiscible with the water. Some of the process parameters disclosed are as follows: agitation temperature 0° to 100°C. PTFE grain diameter preferably in the range of from 0.01 to 400 microns, with excellent properties arising from grain diameters less than 1 to 100 microns, a liquid-PTFE weight ratio of 1:1 to 10:1, with 5 to 50 percent by weight of the dispersion being organic liquid. British Pat. No. 1,100,388 to Daikin discloses a somewhat similar process except that no requirement for immiscibility of the organic liquid in the water is disclosed. This patent also discloses the presence of filler during the agitation step.

Unfortunately, when the water/immiscible organic wetting liquid/agitation system is used, the resultant agglomerates of particles of finely ground polytetrafluoroethylene, after drying, have an electrostatic charge. These agglomerated particles (can be called molding powder) of PTFE, having an average particle diameter generally from 200 to 1000 microns, are used primarily for automatic molding of rings and seals. Performance of the molding powder is judged on its ability to fill the mold rapidly and reproducibly. Electrostatic charges interfere with flowability, in that particles build up and cling to the mold surfaces and effectively block the mold cavity entrance, requiring frequent cleaning and, hence, a reduction in productivity. Electrostatic charge also interferes with the conveying of the molding power to the mold. Conveyor feeders of the vibrating type are especially vulnerable to electrostatic charge due to rapid buildup of charged particles on the conveyor surface, which causes a continuous decrease of the conveying rate.

The present invention provides a solution to the problem of electrostatic charge arising in the process of agitating particles of finely ground polytetrafluoroethylene in water which contains an immiscible organic liquid that wets the polytetrafluoroethylene particles to form agglomerates of said particles, which upon drying possess an electrostatic charge, the solution being to contact the agglomerates with water having a conductivity of at least 50 micromhos/cm to reduce the electrostatic charge on the dried agglomerates. The contacting can be done before or after the drying step, but before is preferred so that a second drying step will not be necessary. It is most convenient to do the contacting by having the water present in the agitation process which forms the agglomerates have a conductivity of at least 50 micromhos/cm. In all these embodiments, this conductivity is most easily achieved by dissolving electrolyte in the water.

It is believed that the agitation of the liquid medium which produces agglomerates of the polytetrafluoroethylene particles also generates the electrostatic charge on the agglomerates, the charge coming from interaction between the two phases of the liquid medium. According to the present invention, the water phase can be made sufficiently conductive to drain off this charge as it is produced or the agglomerates can be contacted with the conductive water after formation.

Any compound which produces the electrolyte effect, i.e., dissolves in the water at the temperature of agitation and dissociates into ions, can be used. Examples of electrolytes include the water soluble acids, salts, and bases, such as the water soluble alkali and alkaline earth metal halides, sulfates, phosphates, carbonates, nitrates, silicates, and hydroxides. Specific electrolytes include sodium chloride, sodium silicate, potassium sulfate, acetic acid, propionic acid, hydrochloric acid, and nitric acid. A preferred group of electrolytes is the water soluble compounds that are volatile at temperatures at which the polytetrafluoroethylene agglomerates are dried, such as at temperatures of 100° to 300°C., and preferably 125° to 200°C., so that upon drying, the electrolyte is removed from the agglomerates by volatilization. "Volatile" as used herein means the compound per se is volatile or it decomposes at drying temperatures to volatile products. To this end, the most preferred electrolytes are the ammonium electrolytes, examples of which are ammonium carbonate and bicarbonate, ammonium hydroxide, ammonium acetate, and ammonium nitrate. Preferably, the electrolyte is also not corrosive to the processing equipment.

The amount of electrolyte required will depend on the conductivity of the water used or of the aqueous phase of the two phase liquid agitation medium prior to electrolyte addition, on the electrolyte used, i.e., number of ions per molecule, solubility, and degree of ionization, on whether or not particulate filler is present, because filler appears to promote the generation of the electrostatic charge, and on the level of electrostatic charge that can be tolerated in the final product. Demineralized water is used as the aqueous phase in the two-phase agitation system to prevent contamination of the polytetrafluoroethylene which would occur if ordinary tap water were used. Demineralized water has a conductivity of less than 10 micromhos/cm. It has been found that an increase in conductivity of the demineralized water to a level of at least about 50 micromhos/cm and preferably at least about 100 micromhos/cm., is required for enough reduction in electrostatic charge to give a significant improvement in flowability of the dried agglomerated polytetrafluoroethylene. This increase in conductivity of the aqueous phase of the two-phase agitation system corresponds to a reduction in electrostatic charge on the dried agglomerated polytetrafluoroethylene from about 70 volts to about 20 volts. Agglomerates of polytetrafluoroethylene that have an electrostatic charge as low as 25 volts show a harmful degree of clinging to metal surfaces. Hence a preferred objective of the present invention is to reduce the electrostatic charge on the agglomerates from 25 volts or higher to a smaller charge, preferably no greater than about 20 volts.

The electrolyte is dissolved in the aqueous phase either prior to commencing or during or after the agitation process, but preferably while some agitation is being conducted, or the agglomerates of polytetrafluoroethylene are washed with a separate charge of the conductive water. In any event, it is preferred that the starting water is demineralized (deionized or distilled) water so that the electrolyte level and type can be controlled to produce the conductivity desired without deleterious contamination of the final product.

The remaining parameters of the process are generally conventional. Briefly, the polytetrafluoroethylene used is unsintered and is of the granular type, often called molding powder, as distinguished from the aqueous dispersion (fine powder) type of polytetrafluoroethylene. The polytetrafluoroethylene is obtained from polymerization as particles having an average diameter of 1000 microns and greater. This polytetrafluoroethylene is finely ground by equipment such as a Micronizer, Ultramizer, Hurricane Mill, or Jet-O-Mizer as disclosed in British Pat. No. 1,100,388 to particles having an average diameter preferably less than 100 microns, although the somewhat larger particle sizes disclosed in U.S. Pat. No. 3,527,857 and British Pat. No. 1,100,388 can also be used, the primary importance of particle size being the ability of the finely ground particles to agglomerate to dense agglomerates, which ability decreases with increasing particle size. The minimum (average) particle size is more or less a function of the particular grinding equipment used and will generally be an average particle diameter of at least 5 microns.

With respect to organic liquid, this liquid should have sufficient immiscibility with the aqueous phase and sufficient wettability for the finely ground polytetrafluoroethylene particles to cause formation of the agglomerates from them. The criteria of immiscibility set forth in U.S. Pat. No. 3,527,857, i.e., no more than 15 percent soluble in water under the process conditions, is generally applicable here. The process condition of temperature of agitation in the present invention can also be from 0° to 100°C. The aspect of wettability can be expressed as a surface tension for the organic liquid of no greater than 40 dynes/cm. at 25°C. and generally at least 10 dynes/cm. at 25°C. Examples of organic liquids include aliphatic hydrocarbons such as hexane and heptane; alicyclic hydrocarbons such as cyclohexane; aromatic hydrocarbons such as benzene and toluene; halogen-containing solvents such as tetrachloroethylene, trichloroethylene, chloroform and chlorobenzene; ethers, esters, and ketones which form a dispersion with water.

Examples of particulate fillers which can be present in the agitation process include mineral, metallic, and glass fillers such as glass fibers and powdered bronze, graphite and mica. The filler particle size (average diameter) is generally about the same as or smaller than the particle size of the particles of finely ground polytetrafluoroethylene so that the resultant free-flowing, generally spherical agglomerates of 200 to 1000 micron average particle diameter can consist of filler particles enveloped by polytetrafluoroethylene. In the case of fibrous shaped filler particles, the lengthwise dimension may be larger than the finely ground PTFE particles, but preferably, the lengthwise dimension is less than the diameter of the resultant PTFE agglomerates.

The agitation process can be conducted by assembling the components, i.e., water, organic liquid, electrolyte, finely ground polytetrafluoroethylene, and filler if any (as a pre-blend with the PTFE) in a grounded, electrically conductive vessel in which the contents can be agitated sufficiently to cause the agglomeration. The simplest equipment is a tank having baffles extending from its interior surface and equipped with a stirrer. Agitation is usually commenced when the desired temperature of agitation has been reached.

Although the limits of operability of the agitation process of the present invention are not confined to the following ranges, these ranges encompass the usual operating conditions: agitation time 5 to 120 minutes, 5 to 30 percent by weight solids (PTFE plus filler if any) and complementally to total 100 percent, 70 to 95 percent liquid medium. Of the solids present, this will consist of 100 percent polytetrafluoroethylene or if filler is present, from 5 to 80 percent by weight filler and complementally to total 100 percent, 20 to 95 percent by weight polytetrafluoroethylene. Of the liquid medium present, generally from 0.1 to 1.0 cc. of the organic liquid per gram of polytetrafluoroethylene will be used, and the remainder of the liquid medium will be sufficient water to give the solids-liquid ratio desired.

Following agitation, the agglomerates are separated from the liquid medium by filtration, which removes mainly the water phase, followed by drying in equipment which enables the organic liquid to be recovered. Although drying can be done at temperatures up to that just below that at which the polytetrafluoroethylene sinters, the drying temperature will usually be between 125° and 200°C. Where volatilization of the electrolyte is desired, it must be sufficiently volatile at the drying temperature and time used so as to be removed during drying.

Instead of contacting the agglomerates with the conductive aqueous phase during the agitation process, the agitation can be carried out with demineralized water as the aqueous phase with no electrolyte added. During the subsequent filtration step, if conducted on a grounded conductive screen, water having a conductivity of at least 50 micromhos/cm. can be poured onto and filtered through the PTFE agglomerates to reduce the electrostatic charge when dried.

The resultant dried agglomerates by either embodiment of process of the present invention are useful for molding in automatic feeding and molding equipment to mold articles which can be sintered to high quality seals and gaskets.

The effect of contacting PTFE agglomerates with conductive water is shown in the following series of experiments: In these experiments, the agitation vessel was a baffled, heated grounded stainless steel tank having a diameter of 46 cm. and height of 46 cm. equipped with a 23 cm. diameter, 45° downdraft agitator. The tank was charged with 38.1 kg. of demineralized water and heated to 70°C. A quantity of electrolyte was dissolved in the water and the conductivity of the water charge determined on a sample cooled to 25°C. Twenty-five hundred g. of perchloroethylene and 4.5 kg. of a blend of 79 percent finely ground polytetrafluoroethylene (average particle size of 35$\mu$) and 21 percent glass fiber, (Owens Corning 709A, 0.08 cm. in length) was charged to the tank and the agitator started at 500 RPM. Agitation at 500 RPM and 70°C. was continued for 5 min. at which time the agitation speed was reduced to 300 RPM and enough 25°C. water was added to cool the slurry at 60°C. Agitation at 300 RPM and 60°C. was continued for 90 min., at which time the slurry was filtered and the agglomerated product dried in a circulating air oven at a temperature of 150°C. After drying, the product was screened to remove oversize. The product consisted of agglomerates of polytetrafluoroethylene, which agglomerates also contained the glass fibers. Details of these experiments are shown in the following table:

| Experiment | Electrolyte[1] Added g. | Avg.Part. Size of Agglomerated Prod.-Microns | Conductivity of $H_2O$ Micromhos/cm | Charge on Product-Volts | Flow g/min Avg. for 1st 3 min. |
|---|---|---|---|---|---|
| 1 | 0 | 510 | 7 | 74 | 32 |
| 2 | 0.05 | 540 | 33 | 25 | 56 |
| 3 | 5.0 | 550 | 256 | 16 | 82 |
| 4 | 60 | 890 | 900 | 19 | 86 |

[1] The electrolyte in experiments 1, 2, and 3 was NaCl and in experiment 4, $(NH_4)_2CO_3$ These results show that as the conductivity of the aqueous phase is increased, the flowability of the agglomerate product also increases as is reflected in the increasing flow rate for the product. Flow rate is measured using a vibrating "Syntron" type of circular feeder manufactured by Allgemeine Elektricitats-Gesellschaft, type TF280-2. Three hundred g of product is charged to the feeder and the total weight of resin discharged is measured at one minute intervals. The effect of static charge on flowability is visible in terms of the greater number of agglomerates clinging to surfaces of the feeder for experiments 1 and 2 as compared to 3 and 4. The improvement in flow rate for experiment 2 over experiment 1 is noticeable, but sufficient clinging of agglomerates to feeder surfaces occurs in experiment 2 to warrant the need for further improvement. Upon sintering, product molded from the agglomerates of experiments 2 and 3 become discolored because of the added NaCl, whereas the product of experiment 4 remains white.

The increased flowability with increasing water conductivity also shows up as a generally decreasing electrostatic charge on the agglomerated product as shown in the table. The values for electrostatic charge disclosed herein are determined by charging a dry 0.40 g. sample of the agglomerated polytetrafluoroethylene (plus filler if any) to the apparatus and procedure described in Am. Jour. Chem. Phys., Vol. 33, No. 4, pg. 340, April, 1965. An electrostatic charge of 20 volts and less is generally tolerable in terms of flowability without harmful buildup in conventional feeding and processing equipment.

Similar improvement in flowability can be obtained by using other electrolytes to increase the conductivity of the aqueous phase of the agitation system. By way of example, the addition of 10 cc. of sodium silicate (42' Baume) to the system of experiment 1 prior to agitation raises the conductivity of the water to 160 micromhos/cm. and gives an agglomerated product of 590 microns in average particle diameter which flows at 88 g/min. average for the first three minutes. Substituting 1.0 g. of $K_2SO_4$ for the sodium silicate gives a conductivity of 110 micromhos/cm., average agglomerate diameter of 610 microns, and a flow rate of 86 g/min. Substituting 100 ml. of 37 percent $NH_4OH$ aqueous solution for the sodium silicate gives a conductivity of 650 micromhos/cm., average agglomerate diameter of 860 microns, and a flow rate of 90 g/min.

The conductivities of water described herein are determined at a water sample temperature of 25°C. using a standard conductivity bridge.

As many apparently widely different embodiments of this invention may be made without departing from the spirit and scope thereof, it is to be understood that this invention is not limited to the specific embodiments thereof except as defined in the appended claims.

What is claimed is:

1. Process for producing agglomerates of particles of finely ground polytetrafluoroethylene which comprises agitating particles of finely ground polytetrafluoroethylene having a particle diameter of between 1 and 100 microns in a mixture of (a) demineralized water having a conductivity of at least 50 micromhos/cm in which the at least 50 micromhos conductivity is obtained by dissolving in the water an electrolyte which is volatile at a temperature of between about 100°C. and 300°C. and (b) an immiscible organic liquid which can be soluble in water in amounts up to 15 percent by weight at the operating temperature of the process and which has a surface tension of no greater than 40 dynes/cm at 25°C., said organic liquid being present in an amount of between 5 and 50 percent by weight of the water and the polytetrafluoroethylene, followed by separating the resulting agglomerates from the water mixture and drying them.

2. The process of claim 1 wherein the electrolyte is an ammonium compound.

3. The process of claim 2 wherein the ammonium compound is volatile at a temperature of from 125° to 200°C.

4. The process of claim 1 wherein particulate filler material is present in the water mixture.

5. The process of claim 4 wherein the particulate filler is glass fiber.

* * * * *